US008949211B2

(12) United States Patent
Lu et al.

(10) Patent No.: US 8,949,211 B2
(45) Date of Patent: Feb. 3, 2015

(54) OBJECTIVE-FUNCTION BASED SENTIMENT

(75) Inventors: Yue Lu, Urbana, IL (US); Maria G Castellanos, Sunnyvale, CA (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 528 days.

(21) Appl. No.: 13/018,412

(22) Filed: Jan. 31, 2011

(65) Prior Publication Data

US 2012/0197903 A1 Aug. 2, 2012

(51) Int. Cl.
*G06F 7/00* (2006.01)
*G06Q 30/02* (2012.01)
*G06F 17/27* (2006.01)

(52) U.S. Cl.
CPC ............ *G06Q 30/02* (2013.01); *G06F 17/2785* (2013.01)
USPC .......................................................... 707/705

(58) Field of Classification Search
USPC ............................. 707/999.102, 999.101, 705
See application file for complete search history.

(56) References Cited

U.S. PATENT DOCUMENTS

| | | | |
|---|---|---|---|
| 7,987,188 B2 * | 7/2011 | Neylon et al. ................. 707/739 |
| 7,996,210 B2 * | 8/2011 | Godbole et al. ................ 704/9 |
| 8,010,539 B2 * | 8/2011 | Blair-Goldensohn et al. ................. 707/750 |
| 8,417,713 B1 * | 4/2013 | Blair-Goldensohn et al. ................. 707/751 |
| 2005/0038780 A1 * | 2/2005 | de Souza et al. ................. 707/3 |
| 2008/0249764 A1 | 10/2008 | Huang et al. |
| 2009/0048823 A1 | 2/2009 | Liu et al. |
| 2009/0125371 A1 * | 5/2009 | Neylon et al. ................. 705/10 |
| 2009/0164417 A1 * | 6/2009 | Nigam et al. ................. 707/2 |
| 2009/0193011 A1 * | 7/2009 | Blair-Goldensohn et al. .... 707/5 |
| 2009/0193328 A1 | 7/2009 | Reis et al. |
| 2009/0282019 A1 | 11/2009 | Galitsky et al. |
| 2009/0306967 A1 | 12/2009 | Nicolov et al. |
| 2009/0319518 A1 * | 12/2009 | Koudas et al. ................. 707/5 |
| 2010/0169317 A1 * | 7/2010 | Wang et al. ................. 707/736 |

OTHER PUBLICATIONS

Weifu Du; Songbo Tan; Xueqi Cheng; Xiaochun Yun; "Adapting Information Bottleneck Method for Automatic Construction of Domain-oriented Sentiment Lexicon"; <http:www.wsdm-conference.org/2010/proceedings/docs/p111.pdf > Publication Date: Feb. 4-6, 2010; on pp. 111-119.

Raymond Y.K. Lau; Chapmann C.L. Laiy; Jian Maz; Yuefeng Li; "Automatic Domain Ontology Extraction for Context-sensitive Opinion Mining"; http://aisel.aisnet.org/cgi/viewcontent.cgi?article=1170&context=icis2009 > Publication Date: 2009.

* cited by examiner

*Primary Examiner* — Hosain Alam
*Assistant Examiner* — Eliyah S Harper (57) ABSTRACT

A system and article are disclosed for objective-function based sentiment. In one example, the system includes a set of domain information, and a computer programmed with executable instructions which operate a set of modules. The modules include a sentiment polarization module for identifying a domain-aspect opinion-word pair within a set of domain data, and assigning a sentiment polarity score to the domain-aspect opinion-word pair based on an objective function which includes sentiment data from the domain information.

14 Claims, 5 Drawing Sheets

$$\left\{ \lambda_0 \sum_{i=1}^{m} \left( O_i - \sum_{j=1}^{n} X_{i,j} S_j \right)^2 \right.$$

$$+ \lambda_g \sum_{j=1}^{n} (G_j - S_j)^2$$

$$+ \lambda_M \sum_{j=1}^{n} \sum_{k=1}^{n} A_{j,k} (S_j - S_k)^2$$

$$\left. + \lambda_d \sum_{j=1}^{n} \sum_{k=1}^{n} B_{j,k} \left[ (S_j^+ - S_k^+)^2 + (S_j^- - S_k^-)^2 \right] \right\}$$

$S_j = S_j^+ - S_j^-$  $\quad for\ j = 1\ldots n$ $S_j^+ \geq 0$  $\quad for\ j = 1\ldots n$ $S_j^- \geq 0$  $\quad for\ j = 1\ldots n$ $S_j \in [-1, 1]$  $\quad for\ j = 1\ldots n$

Fig. 2B

| Domain 302 | Domain Aspect 116 | Opinion Words 306 | Sentiment Polarity Score 308 |
|---|---|---|---|
| Laptop | Battery | Small | +1 |
| Laptop | Battery | Large | -1 |
| Laptop | Battery | Insert | 0 |
| Laptop | Battery | Holds a Charge | +1 |
| Laptop | Battery | Light Weight | +1 |

Fig. 3A

| Domain 302 | Domain Aspect 116 | Opinion Words 306 | Sentiment Polarity Score 308 |
|---|---|---|---|
| Hotel | Room | Quiet | +1 |
| Hotel | Food | Excellent | +1 |
| Hotel | Towels | Many | +1 |
| Hotel | TV | Small | -1 |
| Hotel | View | Tree | 0 |

OBJECTIVE-FUNCTION BASED SENTIMENT

BACKGROUND OF THE INVENTION

Brief Background Introduction

The present invention relates generally to systems and methods for sentiment analysis. Sentiment analysis is a process of managing sentiment information in a way that makes the sentiment in large volumes of opinionated text more understandable or interpretable. There are different ways of performing sentiment analysis, and further improvements are desired.

BRIEF DESCRIPTION OF THE DRAWINGS

Some examples of the invention are described in the following figures.

DETAILED DESCRIPTION

Sentiment analysis is increasingly becoming a key asset for companies to remain competitive in this highly dynamic economy. Many channels for expressing opinions now exist. When these opinions are relevant to a company, they are important sources of business insight, whether they represent critical intelligence about a customer's defection risk, the impact of an influential reviewer on other people's purchase decisions, or early feedback on product releases, company news or competitors. Capturing and analyzing these opinions is a necessity for proactive product planning, marketing, branding and customer service. Sentiment analysis is the process that aims at determining the attitude of a speaker or a writer with respect to some topic. Automated sentiment analysis is the process of training a computer to identify sentiment within context. Sentiment analysis can be done manually, automatically or in a hybrid way. In some systems, sentiment analysis involves extracting sentiment at a coarse level. Or sentiments can be extracted by topic, for example, the sentiment for a given product model.

Due to the large scale of Web opinion data, there is a need for an automatic tool to analyze opinions, especially sentiment toward a wide variety of topics, subjects, products, services, and other domains. In most sentiment analysis applications, the sentiment lexicon plays a central role. However, there is no universally optimal sentiment lexicon since the polarity of words is sensitive to the topic domain. Even in the same domain the same word may indicate different polarities with respect to different domain-aspects. For example, in a laptop review, "large" is negative for the battery aspect while being positive for the screen aspect.

Some sentiment analysis systems only resolve sentiment at document-level where the goal is to predict the sentiment polarity of the whole document. More recently, mainly because of the increasing interest in product reviews, aspect-level sentiment analysis is getting more and more popular. In one sentiment analysis example, aspect-level sentiment analysis involves, first identifying domain-aspects and then detecting sentiment on each aspect.

Sentiment analysis systems can be grouped into supervised and unsupervised systems. Supervised systems require expensive human-labeled data and extract different kinds of features from opinionated text and apply supervised models, such as SVM, maximum entropy, and naïve bayes, to classify the sentiment of a document, a sentence or an aspect. However, it is impractical to label a large number of data for training in every new domain. Unsupervised systems are usually based on expanding sentiment dictionaries, using point wise mutual information or WordNet distance. To handle the domain-specific problem, an unsupervised system either (1) can use heuristic rule-based tools, based on language clues, to infer the polarity of words in the given domain; or (2) can use the overall sentiment ratings to infer the aspect-level ratings.

However, since different sentiment signals can come in different formats, it is often not clear how to combine them in a unified way. Moreover, the sentiment signals can include contradictory sentiment signals received from different sources. Also, there is no principled method in a unified framework that can combine all kinds of sentiment related information, including dictionaries, language clues, and document level overall sentiment ratings.

The present invention addresses and remedies many, if not all, of the concerns discussed above.

The present invention presents a system and method for learning a sentiment lexicon that is not only domain specific but also dependent on the domain-aspects, given a set of opinionated domain data. An optimization framework is presented that provides a unified and principled way to combine different sources of information for constructing and assigning sentiment polarity scores to entries in such a domain-dependent sentiment lexicon.

Sentiment is herein defined to include associating a set of opinion states (e.g. positive/negative, happy/unhappy), or an opinion range (e.g. a score, 0-100, rational number) with a set of domain information (e.g. a product reviews, service quality, topic opinions, domain-aspects 116, feature, subject etc.).

The present invention identifies several sources of information that are useful for determining the domain-dependent sentiment of words. To address the concern that multiple signals sometimes come in different formats and may even cause contradictions, the present invention combines them through appropriate constraints using an objective function and an optimization framework, in which optimal assignments of sentiment scores to aspect opinion-word pairs are found which are most consistent with all the constraints. In this way, the optimization framework provides a unified and principled way to automatically construct a domain-specific aspect-dependent sentiment lexicon by consolidating multiple evidences from different sources.

The constructed sentiment lexicon is not only domain specific but also aspect dependent. The present invention can not only identify new sentiment/opinion-words specific to the given domain (e.g. "private" is positive in hotel reviews; "compatible" is positive about printers) but also determine the different polarities of a word depending on the aspect in domain (e.g. "huge room" vs. "huge price" for hotels; "cheap ink" vs. "cheap appearance" for printers). The present invention is effective in constructing a high quality aspect-dependent sentiment lexicon. The results also demonstrate the advantage of combining multiple evidences over using any single evidence.

Also, since the information from any single information source can be sparse and/or of variable quality, the present invention's combination of signals from multiple sources benefits from other richer and higher quality information sources.

Details of the present invention are now discussed.

Figure 1:
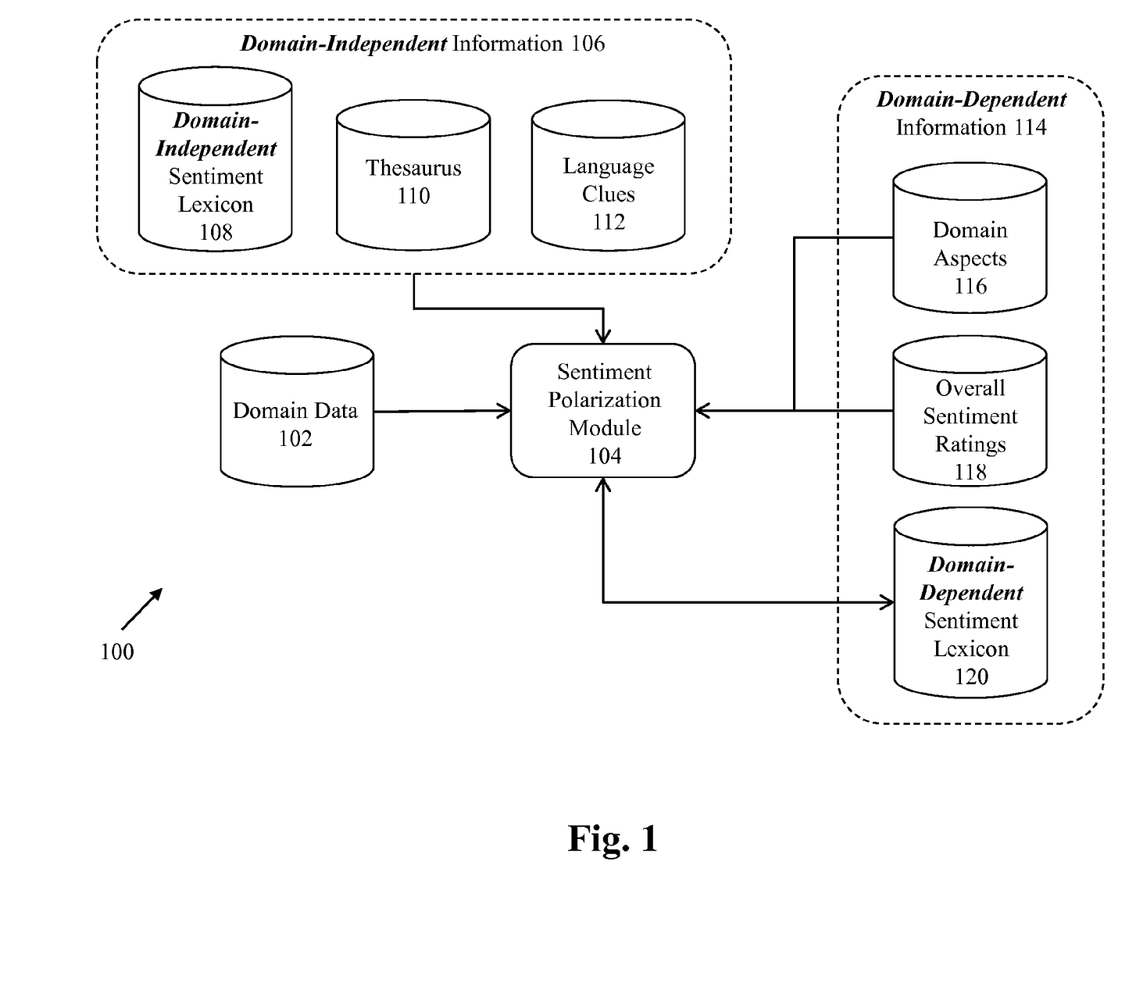
FIG. 1 is a dataflow diagram of one example of an objective-function based sentiment system.
Figure 2A:
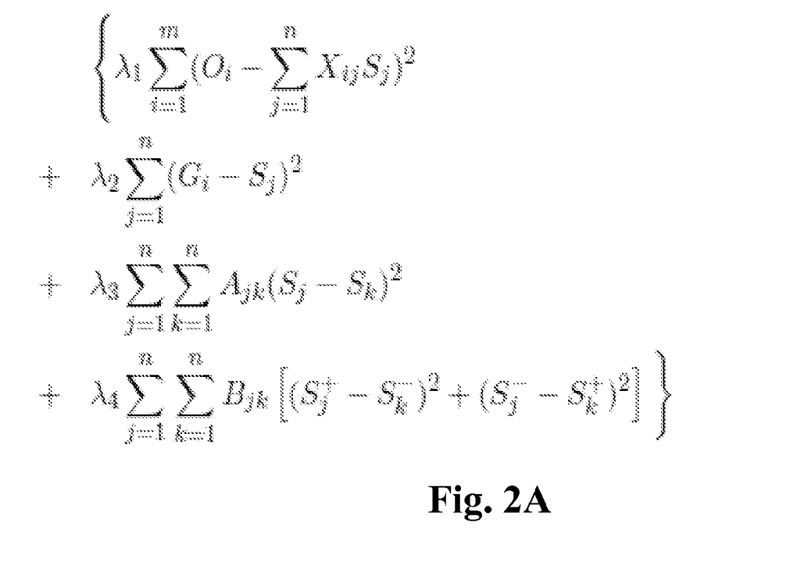
FIGS. 2A & 2B presents an objective function equation set used by one example of the system.
Figure 2B:
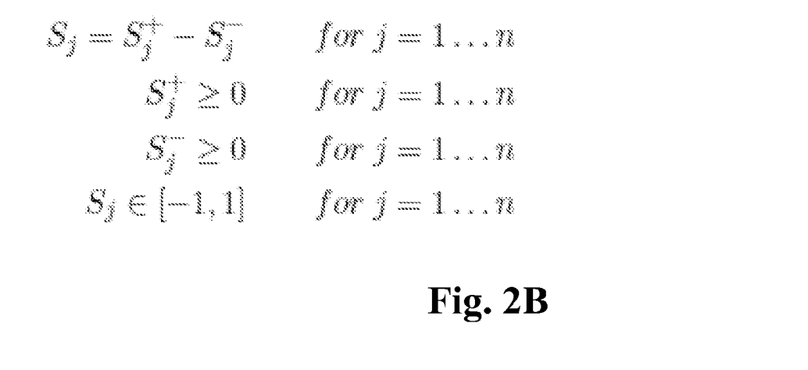
Figure 3A:
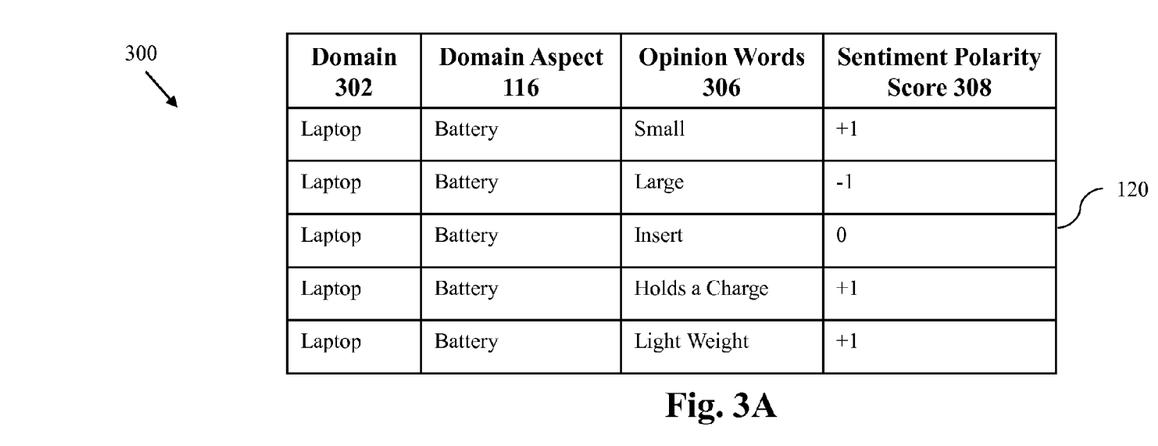
FIGS. 3A & 3B are domain-dependent sentiment lexicons generated by one example of the system.
Figure 3B:
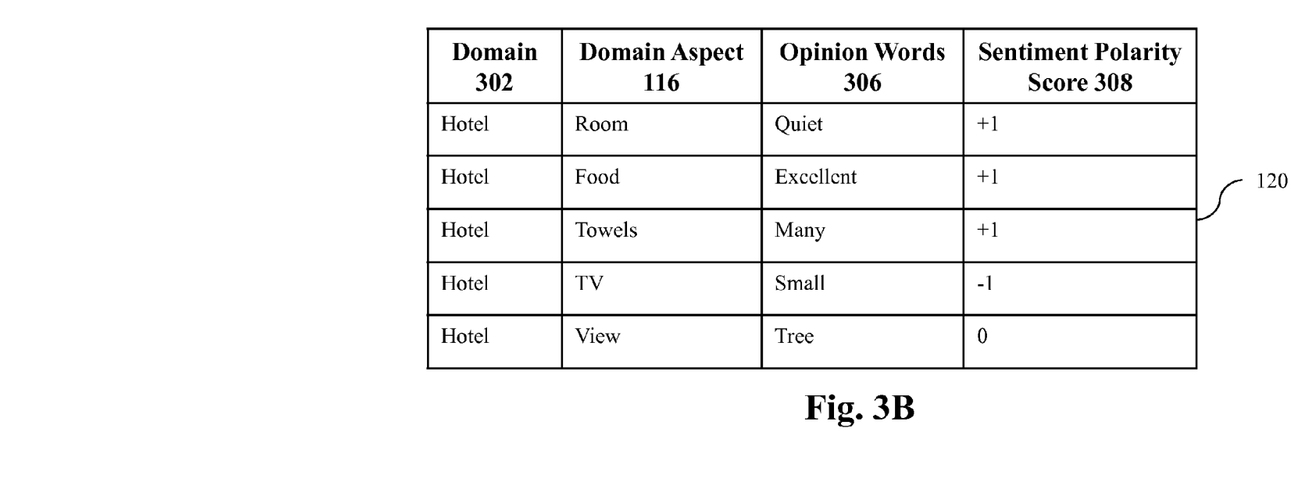

FIG. 1 is a dataflow diagram of one example of an objective-function based sentiment system 100. FIGS. 2A & 2B present an objective function equation set used by one example of the system 100. FIGS. 3A & 3B are domain-dependent sentiment lexicons generated by one example of the system. Due to the integrated operation of the system 100 with the objective function and the domain-dependent sentiment lexicons, FIGS. 1 through 3B are at times discussed together to facilitate understanding of the present invention.

As shown in FIG. 1, a sentiment polarization module 104 receives a set of domain data 102. The domain data 102 (e.g. opinionated review text) corresponds to a set of information (e.g. a document; a file; a clause; a product review, a service quality; customer feedback; user opinions; performance data; cloud service data; a topic; opinionated review text; opinions; a subject; etc.) which pertains to a domain 302 (e.g. a product, service, a news story, a subject, a topic, a laptop computer, a hotel, etc.). The domain data 102 includes a set of documents (i.e. a set of files). The sentiment polarization module 104 can receive the domain data 102 from: a data feed, an on-line dialog, a web or cloud service, or from a previously stored set of information.

The sentiment polarization module 104 processes the domain data 102 in accordance with an objective function (see FIGS. 2A & 2B) to populate the domain-dependent sentiment lexicon 120 based on domain-independent information 106 and domain-dependent information 114.

The domain-independent information 106 includes: a domain-independent sentiment lexicon 108, a thesaurus 110, and language clues 112. The domain-dependent information 114 includes: domain-aspects 116, overall sentiment ratings 118, and domain-dependent sentiment lexicon 120.

Two examples of a domain-dependent sentiment lexicon 120 are shown in FIGS. 3A & 3B. The domain-dependent sentiment lexicons 120 include: the domain 302, and a set of domain-aspect 116 opinion-word 306 pairs with assigned sentiment polarity scores 308 which can be used to perform sentiment analysis on the domain data 102, parsed as either a document/file, a sentence, or a clause as will be discussed in more detail later in this specification.

Once constructed, the domain-dependent sentiment lexicon 120 can also be used to perform: sentiment classification, opinion summarization, and opinion retrieval.

Details on the operation of the objective function are provided later in this discussion.

The domain-independent information 106 includes the domain-independent sentiment lexicon 108. The domain-independent sentiment lexicon 108 is, in one example, a dictionary of opinion-words where words are assigned a sentiment polarity score 308 representing a positive (i.e. +1) or negative (i.e. −1) sentiment. A "neutral" sentiment would have a polarity score 308 of "0". The domain-independent sentiment lexicon 108 (a.k.a. general-purpose sentiment lexicon) contains words that are almost always positive or negative in any domain, such as "excellent" and "bad". This lexicon provides high confidence but low coverage sentiments.

The domain-independent information 106 also includes a thesaurus 110. The thesaurus 110, contains synonym and antonym information. For example, "large" may or may not be positive or negative with respect to a domain-aspect 116, but it should be very similar to "big" and very different than "tiny".

Some of the language clues 112, in the domain-independent information 106, which help the sentiment polarization module 104 assign the sentiment polarity score 308 include "and", "but", and "negation" clues.

For example, domain data 102 clauses that are connected with "and"-like conjunctives usually express the same sentiment polarity. For example, "battery lasts long and screen size is large" implies that "long" for "battery" and "large" for "screen size" are of the same polarity. Other "and"-like terms include: as well as, likewise.

Clauses that are connected with "but"-like conjunctives usually express the opposite sentiment polarity. For example, "battery lasts long but screen size is tiny" indicates that "long" for "battery" and "tiny" for "screen size" are of the opposite polarity. Other "but"-like terms include: however, nevertheless, though, although, except that, except for, besides, with the exception of, despite, in spite of.

Clauses that include "negation" words, such as "no", "not", and "never", reverse the sentiment of the opinion-word 306 in the same clause. For instance, "not happy" should have opposite sentiment as "happy".

The domain-dependent information 114 includes the domain-aspects 116. A domain-aspect 116 is a word or phrase which sub-categorize the domain 302 into: products, service offerings, features, and other topics or themes. Domain-aspects 116 can be obtained from a domain experts manual. Domain-aspects 116 can also be discovered using automatic methods, with no or minimal human supervision. Domain-aspects 116 are associated with word-clusters. For example, the domain-aspect 116 "battery" can be associated with a word-cluster including words like: battery, battery life, and batteries.

The domain-dependent information 114 also includes the overall sentiment ratings 118. The overall sentiment ratings 118 provide a sentiment rating/score at a higher level in the domain data 102, such as at the document or file level. For example, services such as TripAdvisor, Epinions, and Amazon provide sets of opinionated text that are often accompanied by an overall sentiment rating 118. Such opinionated data is abundant on the Web. For example, there are more than 40 million travel-related reviews on TripAdvisor, and millions of reviews on millions of products from Epinions. The intuition is that the overall sentiment rating 118 conveys some information about the sentiment expressed in the text. For example, it is very unlikely that a user uses all negative words in the text while giving an overall sentiment rating 118 of 5 stars.

Now that some detail on the domain-independent information 106 and domain-dependent information 114 used by the sentiment polarization module 104 has been provided, a more detailed discussion of how the sentiment polarization module 104 operates is now provided.

After receipt of the domain data 102, a first goal of the sentiment polarization module 104 is to identify a set of domain-aspect 116 opinion-word 306 pairs from the domain data 102, which will then be stored in the domain-dependent sentiment lexicon 120 and form a search space for an objective function, such as the one shown in FIG. 2A, and which is discussed in more detail later. Example domain-dependent sentiment lexicon 120 data structures are shown in FIGS. 3A & 3B. Each domain-aspect 116 opinion-word 306 pair serves as an entry in the lexicon 120, which also includes a domain 302 field.

To find these domain-aspect 116 opinion-word 306 pairs, the sentiment polarization module 104 begins by splitting the domain data 102 into a set of sentences. Then each sentence in the domain data 102 is tagged with those domain-aspects 116, whose word-cluster overlaps with the words in the sentence.

However, in some sets of domain data 102 (e.g. online reviews), one sentence can cover multiple domain-aspects 116 distributed over several sentence clauses. A "clause" is a sub-portion of a sentence. Also, sentiment polarity can vary from clause to clause within the same sentence. Thus, in another example embodiment, the sentiment polarization module 104 splits the domain data 102 into a set of sentences, which are then further split, using a syntactic parser such as the "Stanford Parser", into a set of clauses.

The "Stanford Parser" splits the domain data 102 sentences into syntactic tree structures. The subtrees tagged by the "Stanford Parser" as "simple declarative clauses", are defined as clauses are individually tagged with a domain-aspect 116. For example, using the "Stanford Parser", a domain data 102 sentence, "The battery is long and screen looks bright." becomes "(ROOT (S (S (NP (DT The) (NN battery)) (VP (VBZ is) (ADJP (JJ long)))) (CC and) (S (NP (NN screen)) (VP (VBZ looks) (ADJP (JJ bright)))) ( . . . )))" where the subtrees "S" (i.e., simple declarative clause) are the clauses.

Multiple fragmented clauses within a single sentence are also merged into longer and more meaningful clauses. For instance, although "I like to swim in the pool." are initially divided into two clauses, i.e., "(ROOT (S (NP (PRP I)) (VP (VBP like) (S (VP (TO to) (VP (VB swim) (PP (IN in) (NP (DT the) (NN pool))))))) ( . . . )))", they will be combined into one clause.

Then each clause in the domain data 102 is tagged with those domain-aspects 116, whose word-cluster overlaps with the words in the clause. For example, a sentence such as, "The battery is long and screen looks bright." will be segmented into two clauses. "The battery is long" tagged with "battery" aspect 116 and "screen looks bright" tagged with "screen" aspect 116.

The other non-aspect 116 and non-stop words in each clause are considered potential opinion-words 306, and are stored as aspect 116 opinion-word 306 pairs in the domain-dependent sentiment lexicon 120. For example, "long" is potential opinion-word for "battery", and "looks" and "bright" are potential opinion-words for "screen".

If a clause has been tagged with more than one domain-aspect 116, then the candidate opinion-words 306 are paired with each aspect 116. Other aspect 116 segmentation and tagging techniques for extracting the aspect 116 opinion-word 306 pairs can also be used.

After the aspect 116 opinion-word 306 pairs have been identified and stored in the domain-dependent sentiment lexicon 120, the sentiment polarization module 104 begins a process of assigning a sentiment polarity score 308 to each of the aspect 116 opinion-word 306 pairs.

The sentiment polarization module 104 performs this assignment by combining and reconciling both the domain-independent information 106 and the domain-dependent information 114 using an objective function, such as the one shown in FIG. 2A. The sentiment polarity score 308 assigned to an aspect 116 opinion-word 306 pair is that sentiment score which optimizes the objective function for that aspect 116 opinion-word 306 pair. The objective function is optimized using constraints applicable to each of the different sources of information in the domain-independent information 106 and domain-dependent information 114 sets.

In one example embodiment, the objective function is defined more formally using the equations shown in FIGS. 2A & 2B, the terms of which are now described.

Given a set of domain data 102 which includes: m sets of "opinionated text data"; k predefined domain-aspects 116; v opinion-words 306; and n=k×v, which is the number n of aspect 116 opinion-word 306 pairs, the objective function is used to solve for "S", which is the sentiment polarity score 308. S=argmin $\Omega$, where $\Omega$ is the objective function, comprised of constraints, as shown in FIG. 2A, subject to the bounds shown in FIG. 2B.

In the objective function $\Omega$ the following terms are defined. O is a m×1 vector, where $O_i$ is the overall sentiment rating 118 of the "review" i, which is normalized to [−1, 1]. X is a m×n matrix, where $X_{ij}$ is the number of times that aspect 116 opinion-word 306 pair i occurs in "review" j divided by the total number of aspect 116 opinion-word 306 pair in "review" j. "S" is an n×1 vector, where each $S_j \epsilon [-1, 1]$ indicates the sentiment polarity score 308 of the aspect 116 opinion-word 306 pair j in the given domain 302. In one example embodiment, if $a_j$ denote the aspect 116 of j, $w_j$ the opinion-word 306 in aspect 116 opinion-word 306 pair j. Then $S_j$ is a concise representation of an entry in the domain-dependent sentiment lexicon 120, i.e. $S_j = L_c(a_j, w_j)$.

Continuing with the objective function $\Omega$ terms, G is a n×1 vector, where $G_i$ is a prior sentiment score of aspect 116 opinion-word 306 pair i, which is normalized to [−1, 1]. A is a n×n matrix, where $A_{jk}$ is 1 if aspect 116 opinion-word 306 pair j and aspect 116 opinion-word 306 pair k have similar sentiments (e.g. they are synonyms in the thesaurus 110 or they are connected by "and" rules in the review). B is a n×n matrix, where $B_{jk}$ is 1 if aspect 116 opinion-word 306 pair j and aspect 116 opinion-word 306 pair k have opposite sentiments (e.g. they are antonyms in the dictionary or they are connected by "but" rules in the review). $\lambda 1, \lambda 2, \lambda 3$, and $\lambda 4$ are weighting parameters which are empirically set to a degree that each source of constraint information can be trusted. For example, if the synonyms and antonyms are of equal importance, then set $\lambda 3 = \lambda 4$.

An intuitive discussion of the objective function's constraint terms (1), (2), (3), and (4) are now provided.

The overall sentiment ratings 118 represent the domain data 102 document's overall sentiment score. Term (1), in FIG. 2A, requires that the overall sentiment rating 118 for each document (i.e. $O_i$) is positively correlated with the sentiments of the aspect 116 opinion-word 306 pairs within the document.

Constraints based on the domain-independent sentiment lexicon 108 include Term (2), in FIG. 2A, which requires that the sentiment polarity score 308 of the aspect 116 opinion-word 306 pair j, (i.e. $S_j$), should follow the domain-independent sentiment lexicon 108, (i.e. $G_j$). This component in the objective function favors a domain-dependent sentiment polarity score 308 assignment that is close to the sentiment polarity score 308 that would otherwise be assigned by the domain-independent sentiment lexicon 108.

Term (3) presents a constraint based on similar sentiments. Similar sentiments can be obtained from different information sources. For example, consider any two aspect 116 opinion-word 306 pairs j and k on the same aspect 116 (i.e. $a_j = a_k$), if $w_j$ and $w_k$ appear as synonyms in the thesaurus 110, or if the aspect 116 opinion-word 306 pairs j and k are often concatenated with conjunctives like "and" in the corpus, it can be inferred that their sentiments will be similar. Thus term (3), in FIG. 2A, requires that whenever two instances $S_j$ and $S_k$ are connected in the matrix A, their sentiment polarity scores 308 should be close.

Constraints based on opposite sentiments are presented in Term (4). Term (4), in FIG. 2A, requires that whenever two instances $S_j$ and $S_k$ are connected in the matrix B, (e.g. perhaps because their aspects 116 were identified as antonyms in the thesaurus 110, or because their clauses were concatenated with conjunctives like "but", as discussed in the language clues 112) their sentiment polarity scores 308 should be opposite, (i.e., their signs are different but their absolute values are close).

We separate the representation of sign and absolute value for each S j by introducing two additional non-negative variables S+j and S−j (as in Term (5)) We require S+j and S−j both to be non-negative (in Term (6) and (7)), but at most one of them is active (i.e. positive), the other being zero. In this way, 1) which variable being active represents the sign of S j, i.e. S+j being active is equivalent to S j being positive; S−j being active is equivalent to S j being negative; and 2) the value of the active variable (S+j or S−j) represents the absolute value of S j. Term (8) ensures the assigned sentiment scores are within defined range.

Thus the objective function Ω captures logical deductions from the dictionary and the language clues. The objective function Ω also has a convex property, enabling theories and methods of convex minimization to be applied, including the property that, if a local minimum exists for a convex minimization problem, then the local minimum is also guaranteed to be a global minimum. A globally optimum solution to the present invention's optimization problem is thus solved for.

FIGS. 3A & 3B present two example sets of the domain-dependent sentiment lexicon 120. In FIG. 3A, the domain 302 is that of a "laptop" and the domain-aspect 116 is identified as the laptop's "battery". Opinion-words 306 identified in the domain data 102 include: "small", "large", "insert", "holds a charge", and "light weight".

Using the objective function Ω, the sentiment polarization module 104 assigned the following sentiment polarity scores 308 to the domain-aspect 116 opinion-word 306 pairs. The sentiment polarization module 104 calculated that a "small" "battery" for a "laptop" is a positive sentiment, and thus assigned a "+1" sentiment polarity score 308 to the "battery-small" domain-aspect 116 opinion-word 306 pair. This same positive sentiment was also assigned to the "battery-holds a charge" and "battery-light weight" domain-aspect 116 opinion-word 306 pairs.

The sentiment polarization module 104, however, calculated that a "large" "battery" for a "laptop" is a negative sentiment, and thus assigned a "−1" sentiment polarity score 308 to the "battery-large" domain-aspect 116 opinion-word 306 pair. The sentiment polarization module 104, assigned a "0" sentiment polarity score 308 to the "battery-insert" domain-aspect 116 opinion-word 306 pair since "insert" was not calculated to express an opinion or sentiment. The sentiment polarization module 104 will then delete the "battery-insert" domain-aspect 116 opinion-word 306 pair from the domain-dependent sentiment lexicon 120.

In FIG. 3B, the domain 302 is that of a "hotel" and the domain-aspects 116 include: "room", "food", "towels", "TV", and "view". The sentiment polarity scores 308 assigned to the domain-aspect 116 opinion-word 306 pairs are also shown; however, the domain-aspect 116 opinion-word 306 pair "view-tree" with a sentiment polarity score 308 of "0" will likely be dropped from this example version of the domain-dependent sentiment lexicon 120, since in some instances a "tree" may "block a view" and in other instance a "tree" may "add to the view". In another example embodiment, the domain-aspect 116 opinion-word 306 pair "view-tree" may be kept in the domain-dependent sentiment lexicon 120, if the domain 302 becomes "a specific room in a specific hotel at a specific address".

Figure 4:
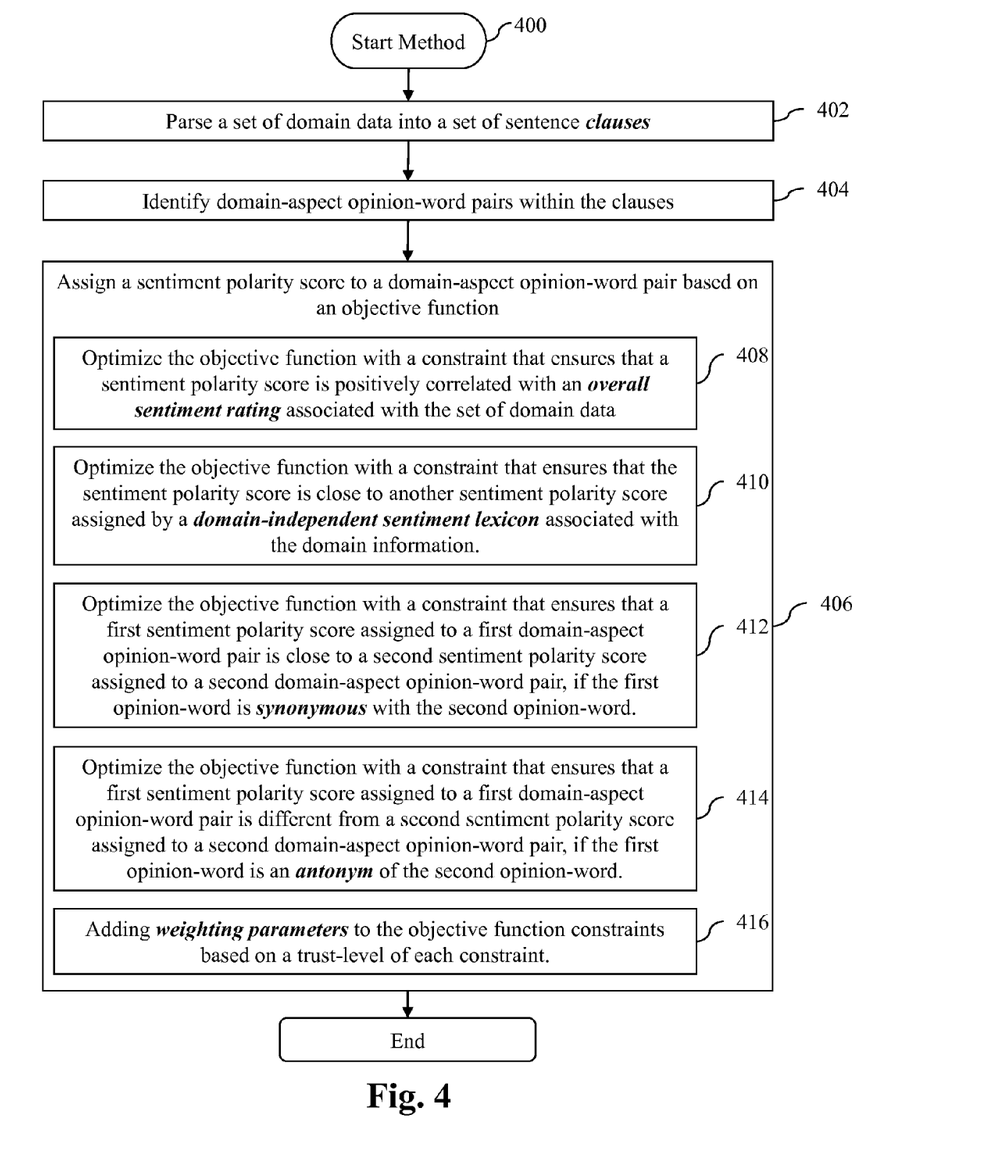
FIG. 4 is a flowchart of one example of an objective-function based sentiment method.

FIG. 4 is a flowchart of one example of an objective-function based sentiment method 400. The blocks comprising the flowchart can be effected in any order, unless a specific order is explicitly stated. Also, those skilled in the art will recognize that while one example of the present invention's method is now discussed, the material in this specification can be combined in a variety of ways to yield other examples as well. The method next discussed is to be understood within a domain provided by this and other portions of this detailed description.

The method 400 begins in block 402, by parsing a set of domain data into a set of sentence clauses. Next in block 404, identifying domain-aspect opinion-word pairs within the clauses. Then in block 406, assigning a sentiment polarity score to a domain-aspect opinion-word pair based on an objective function.

In block 408, optimizing the objective function with a constraint that ensures that a sentiment polarity score is positively correlated with an overall sentiment rating associated with the set of domain data. Next in block 410, optimizing the objective function with a constraint that ensures that the sentiment polarity score is close to another sentiment polarity score assigned by a domain-independent sentiment lexicon associated with the domain information.

Then in block 412, optimizing the objective function with a constraint that ensures that a first sentiment polarity score assigned to a first domain-aspect opinion-word pair is close to a second sentiment polarity score assigned to a second domain-aspect opinion-word pair, if the first opinion-word is synonymous with the second opinion-word. And in block 414, optimizing the objective function with a constraint that ensures that a first sentiment polarity score assigned to a first domain-aspect opinion-word pair is close to the negation of a second sentiment polarity score assigned to a second domain-aspect opinion-word pair, if the first opinion-word is an antonym of the second opinion-word. Then in block 416, adding weighting parameters to the objective function constraints based on a trust-level of each constraint.

Figure 5:
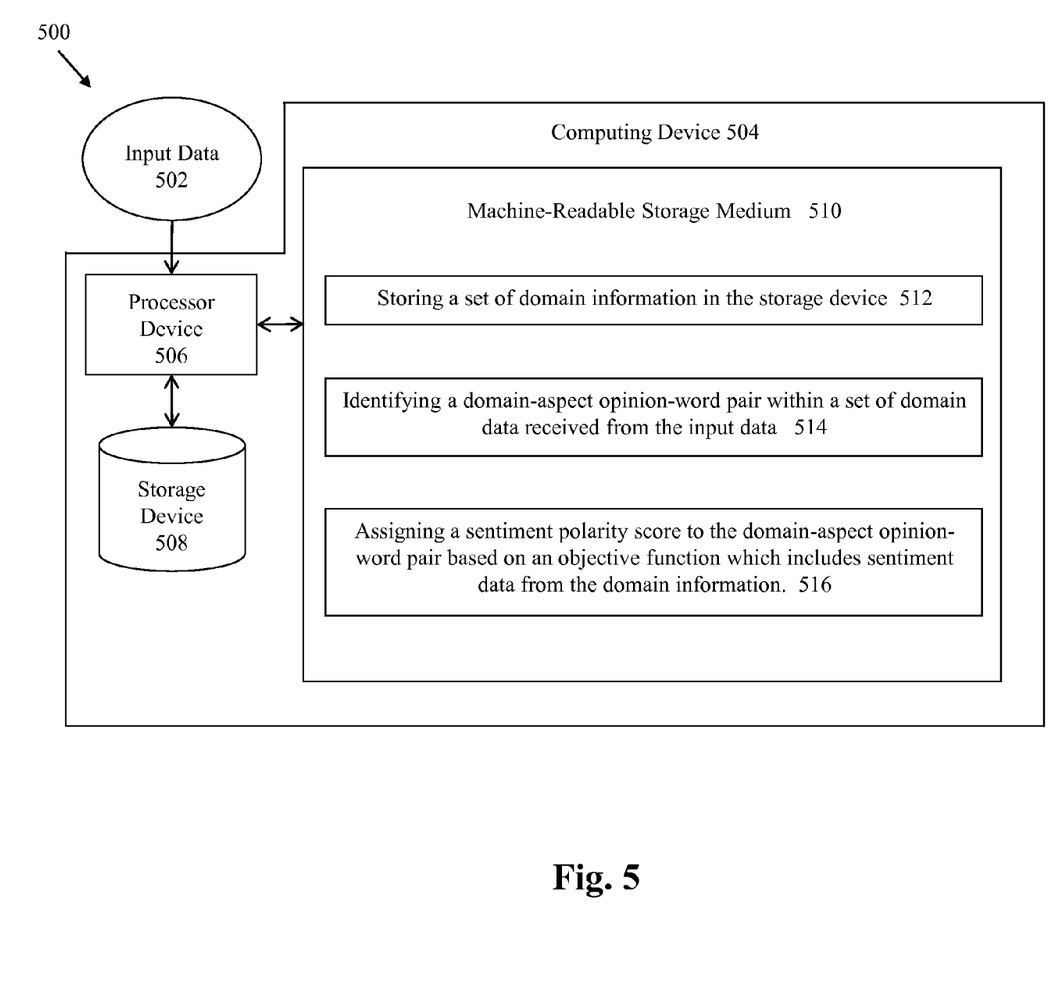
FIG. 5 is another example of the objective-function based sentiment system.

FIG. 5 is another example 500 of the objective-function based sentiment system 100. The diagram 500 shows input data 502 being received by a computing device 504. The computing device 504 includes a processor 506, a storage device 508, and a machine-readable storage medium 510. Instructions within the machine-readable storage medium 510 control how the processor 506 interprets and transforms the input data 502, using data within the storage device 508.

The instructions stored in the machine-readable storage medium 510 include: block 512, storing a set of domain information in the storage device 508. Next in block 514, identifying a domain-aspect opinion-word pair within a set of domain data received from the input data 502. Then in block 516, assigning a sentiment polarity score to the domain-aspect opinion-word pair based on an objective function which includes sentiment data from the domain information.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and machine-readable storage medium using a bus and performs operations and tasks that implement one or more blocks stored in the machine-readable storage medium.

As used herein and in the claims, these words are further defined as follows:

The term "cloud" is a computer network accessible over the internet and/or web that is dynamically scalable with virtualized resources, such as printing resources. Users are not required to have knowledge or expertise in the infrastructure of the cloud that relies on the internet to satisfy the computing or printing needs of users. The cloud provides computer and/or printing device services with business applications that are accessible from a web browser while software and data are stored on servers in the cloud. For example, a printing cloud system supports infrastructure for printing device services, platform for the printing device services, and software for the printing device services.

The term "file" or "a set of files" refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Functional and software instructions described above are typically embodied as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

In one example, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations thereof. It is intended that the following claims cover such modifications and variations as fall within the true spirit and scope of the invention.

What is claimed is:

1. A system, comprising:
a set of domain information; and
a computer; and
a sentiment polarization module executable in the computer to:
identify a first domain-aspect opinion-word pair from plural domain-aspect opinion-word pairs within domain data pertaining to a given domain; and
assign a sentiment polarity score to the first domain-aspect opinion-word pair based on an objective function which includes sentiment data from the domain information, the objective function including: a first constraint specifying that the sentiment polarity score is positively correlated with an overall sentiment rating associated with the domain data; and a second constraint specifying that the sentiment polarity score assigned to the first domain-aspect opinion-word pair is related to a sentiment polarity score assigned to a second domain-aspect opinion-word pair from the plural domain-aspect opinion-word pairs, depending upon whether an opinion word in the first domain-aspect opinion-word pair is a synonym or antonym of an opinion word in the second domain-aspect opinion-word pair.

2. The system of claim 1:
wherein the domain information includes:
a set of domain-independent information including sentiment data assigned to opinion-words independent of the given domain; and
a set of domain-dependent information including sentiment data assigned to opinion-words dependent upon the given domain; and
wherein the assigning further includes assigning the sentiment polarity score based on the domain-independent information and the domain-dependent information.

3. The system of claim 1:
wherein the objective function is optimized using a set of constraints including the first constraint and the second constraint.

4. The system of claim 3:
wherein the set of constraints further includes a constraint specifying that the sentiment polarity score is close to another sentiment polarity score assigned by a domain-independent sentiment lexicon associated with the domain information.

5. The system of claim 1:
wherein the objective function includes weighting parameters that are set to different values for different trust levels of the first and second constraints, and the sentiment polarity score assigned to the first domain-aspect opinion-word pair is based on the weighting parameters.

6. An article comprising at least one non-transitory computer-readable storage medium storing instructions that upon execution cause a computer system to:
identify domain-aspect opinion-word pairs within domain data pertaining to a given domain; and
assign a first sentiment polarity score to a first of the domain-aspect opinion-word pairs based on an objective function which includes sentiment data from a set of domain-independent information and a set of domain-dependent information, the set of domain-independent information including sentiment data assigned to opinion-words independent of the given domain, and the set of domain-dependent information including sentiment data assigned to opinion-words dependent upon the given domain, and the objective function includes a first constraint specifying that the first sentiment polarity score assigned to the first domain-aspect opinion-word pair is related to a second sentiment polarity score assigned to a second of the domain-aspect opinion-word pairs, dependent upon whether an opinion word in the first domain-aspect opinion-word pair is a synonym or antonym of an opinion word in the second domain-aspect opinion-word pair.

7. The article of claim 6:
wherein the domain-independent information is at least one from a group including: a domain-independent sentiment lexicon; a dictionary; a synonym dictionary; an antonym dictionary; a thesaurus; a set of language clues; an "and" language clue; a "but" language clue; and a "negation" language clue.

8. The article of claim 6:
wherein the domain-dependent information is at least one from a group including: a domain-dependent sentiment lexicon; domain-aspects; word-clusters; an overall sentiment ratings; and a document-level overall sentiment rating.

9. The article of claim 6, wherein the identifying comprises:
parsing the domain data into a set of sentence clauses;
tagging each clause with a domain-aspect having a word-cluster which overlaps with words in the clause; and
identifying opinion words within the clauses.

10. A sentiment polarity system comprising:
a set of domain information;
at least one processor; and
a sentiment polarization module executable on the at least one processor to:
identify a first of plural domain-aspect opinion-word pairs within first domain data pertaining to a given domain;
assign a first sentiment polarity score to the first domain-aspect opinion-word pair based on an objective function which includes sentiment data from the set of domain information, wherein the objective function includes a first constraint specifying that the first sentiment polarity score assigned to the first domain-aspect opinion-word pair is related to a second sentiment polarity score assigned to a second of the plural domain-aspect opinion-word pairs, depending upon whether an opinion word in the first domain-aspect opinion-word pair is a synonym or antonym of an opinion word in the second domain-aspect opinion-word pair;
populate a domain-dependent sentiment lexicon with the first domain-aspect opinion-word pair and the first sentiment polarity score; and
assign a sentiment polarity score to a domain-aspect opinion-word pair within second domain data based on the domain-dependent sentiment lexicon.

11. The system of claim 10, wherein the objective function further includes a second constraint specifying that the first sentiment polarity score is positively correlated with an overall sentiment rating associated with a document in the first domain data.

12. The article of claim 6, wherein the objective function further includes a second constraint specifying that the first sentiment polarity score is positively correlated with an overall sentiment rating associated with the domain data.

13. The article of claim 12, wherein the objective function is includes weighting parameters that are set to different values for different trust levels of the first and second constraints, and the first sentiment polarity score assigned to the first domain-aspect opinion-word pair is based on the weighting parameters.

14. The system of claim 11, wherein the objective function is includes weighting parameters that are set to different values for different trust levels of the first and second constraints, and the first sentiment polarity score assigned to the first domain-aspect opinion-word pair is based on the weighting parameters.

* * * * *